(12) United States Patent
Hunzinger (10) Patent No.: US 7,894,467 B2
(45) Date of Patent: Feb. 22, 2011

(54) ADAPTIVE MEDIUM ACCESS CONTROL FOR WIRELESS COMMUNICATION SYSTEM

(75) Inventor: Jason F. Hunzinger, Escondido, CA (US)

(73) Assignee: Denso Corporation, Kariya (JP)

( * ) Notice: Subject to any disclaimer, the term of this patent is extended or adjusted under 35 U.S.C. 154(b) by 867 days.

(21) Appl. No.: 11/891,023

(22) Filed: Aug. 8, 2007

(65) Prior Publication Data

US 2009/0041050 A1 Feb. 12, 2009

(51) Int. Cl.
H04L 12/413 (2006.01)
(52) U.S. Cl. .................. 370/447; 370/350; 370/434
(58) Field of Classification Search .......... 370/350, 370/434, 447
See application file for complete search history.

(56) References Cited

U.S. PATENT DOCUMENTS

| 6,078,568 | A * | 6/2000 | Wright et al. .......... 370/312 |
| 7,027,462 | B2 * | 4/2006 | Benveniste ............ 370/447 |
| 2008/0095124 | A1 * | 4/2008 | Ramos et al. .......... 370/336 |
| 2010/0135319 | A1 * | 6/2010 | Wang et al. ........... 370/445 |

OTHER PUBLICATIONS

G. Bianchi, L. Fratta, M. Oliveri, "Performance Evaluation and Enhancement of the CSMA/CA MAC Protocol for 802.11 Wireless LANs," Proceedings of PIMRC pp. 392-396, Oct. 1996.
F. Cali, M. Conti, E. Gregori, "IEEE 802.11 Protocol: Design and Performance Evaluation of an Adaptive Backoff Mechanism," IEEE Journal on Selected Areas in Communications, vol. 18, No. 9, pp. 1774-1786, Sep. 2000.
F. Cali, M. Conti, E. Gregori, "Dynamic Tuning of the IEEE 802.11 Protocol to Achieve a Theoretical Throughput Limit," IEEE/ACM Transactions on Networking, vol. 8, No. 6, pp. 785-799, Dec. 2000.
X. Yang and N. H. Vaidya, "DSCR: A More Stable MAC Protocol for Wireless Networks," Technical Report, Aug. 2002.
M. Benveniste, "'Tiered Contention Multiple Access' (TCMA), A QOS-Based Distributed MAC Protocol," IEEE PIMRC 2002.
S. Garg, M. Kappes, A. S. Krishnakumar, "On the Effect of Contention—Window Sizes in IEEE 802.11b Networks," Avaya Labs, 2002.
L. Lin, W. Jia, B. Han, L. Zhang, "Performance Improvement using Dynamic Contention Window Adjustment for Initial Ranging in IEEE 802.16 P2MP Networks," WCNC 2007—IEEE Wireless Communications and Networking Conference, vol. 8, No. 1, pp. 1752-1757.

* cited by examiner

*Primary Examiner*—Phuc Tran
(74) *Attorney, Agent, or Firm*—Harness, Dickey & Pierce, P.L.C.

(57) ABSTRACT

A method is provided for adapting a contention window for a given node in a wireless communication system. The method includes: defining a target parameter indicative of congestion on a transmission medium; determining a number of transmitting nodes ready to access the transmission medium; and determining a contention window from which to select a delay value for transmitting over the transmission medium, where the contention window is a function of the target parameter and the number of transmitting nodes.

14 Claims, 5 Drawing Sheets

ADAPTIVE MEDIUM ACCESS CONTROL FOR WIRELESS COMMUNICATION SYSTEM

FIELD

The present disclosure relates generally to channel access control mechanisms and, more particularly, to medium access control (MAC) for wireless communication systems.

BACKGROUND

In wireless local area networks (WLANs) operating according to the IEEE 802.11 family of standards, each communication source uses Medium Access Control (MAC) procedures to determine when to transmit a pending frame. When a frame is pending at a source, the source determines whether the communication channel (medium) is busy or idle. If the medium is idle, the source waits for the medium to be idle for at least an Inter-Frame Spacing (IFS) time before transmitting. However, if the communication medium is busy when a frame is ready, the MAC procedures randomly select a Contention Window (CW) backoff value x from a range of values. The range of values, the delay range, is generally a range of integers from 0 to (C−1). In that case, C defines the delay range.

According to the MAC procedure for backoff, the source waits for the medium to be idle. Then, the source waits until the medium has been idle for a cumulative time that depends on the CW backoff value x. The source counts idle time, in excess of IFS after each busy period, toward the cumulative time. Once the amount of time accumulates to the CW backoff value x, the source transmits the pending frame. This method can be implemented using a timer (or countdown) where the source tracks idle time in excess of IFS, until a timeout occurs (or the countdown reaches zero). Since different sources may select different CW backoff values, they may wait different durations before transmitting and thus avoid a collision. However, since the selection is random, two or more sources may select the same CW backoff value, wait the same duration, and transmit at the same time. The larger the delay range, the lower the likelihood that two or more stations randomly select the same CW backoff value. However, collisions can also occur if stations select different backoff values but those backoffs timeout at the same time.

According to the MAC procedures, a source may treat broadcast and unicast frames differently. Therefore, frames may be lost due to different reasons. If a unicast frame is larger than a threshold, the MAC uses a four-way handshake including a Request-to-Send (RTS), a Clear-to-Send (CTS), a data frame, and acknowledgment (ACK) frame. If the source does not receive a CTS or ACK in response to an RTS or data frame respectively, then the source can determine a failure occurred. According to the MAC procedures, the source increases the upper bound of the delay range when a failure occurs. According to the procedures, the C value is incremented exponentially to take on higher powers of 2. However, even if a CTS is received by the source, the ACK may not be sent if another source (a hidden node) did not hear the CTS and transmitted another frame that collided with the source's data frame. However, broadcast frames (and unicast frames smaller than the threshold) do not use the handshake. Thus, for these frames, the MAC handshake mechanism is not available to detect failures and the MAC procedures do not increment the delay range.

Broadcast frames from two sources can collide if both sources attempt to transmit at the same time. This can occur when two frames are pending at two different sources and those sources randomly select the same CW backoff value, causing the two sources to transmit at the same time. Another way this can occur is if the two frames started pending at different times but the two sources randomly selected different CW backoff values that happen to differ by the amount of cumulative idle time between when the two frames started pending.

Collisions occur when two or more sources transmit frames at the same time. A receiver may be able to decode one of the frames, losing the other. Or, the interference may cause the receiver to be unable to decode either of the frames. If the frames were broadcast frames, the MAC handshake method is not used, so the sources may be unable to detect that the collision occurred and the frame or frames were not received. Therefore, it is desirable to adapt the backoff procedure for frames that have no failure detection mechanism (such as broadcast frames).

The statements in this section merely provide background information related to the present disclosure and may not constitute prior art. While reference is made through this disclosure to MAC, it is readily understood that the broader aspect of this disclosure are applicable more generally to channel access control mechanisms.

SUMMARY

A method is provided for adapting a contention window for a given node in a wireless communication system. The method includes: defining a target parameter indicative of congestion on a transmission medium; determining a number of transmitting nodes ready to access the transmission medium; and determining a contention window from which to select a delay value for transmitting over the transmission medium, where the contention window is a function of the target parameter and the number of transmitting nodes.

In another aspect of this disclosure, a method is provided for determining a number of nodes ready to access a transmission medium in a wireless communication system. The method includes: observing an idle time between frames received at a given node; determining a contention window currently in use by the given node; and estimating a number of nodes ready to access the transmission medium as a function of the idle time and the contention window currently in use by the given node.

Further areas of applicability will become apparent from the description provided herein. It should be understood that the description and specific examples are intended for purposes of illustration only and are not intended to limit the scope of the present disclosure.

The drawings described herein are for illustration purposes only and are not intended to limit the scope of the present disclosure in any way.

DETAILED DESCRIPTION

Figure 1:
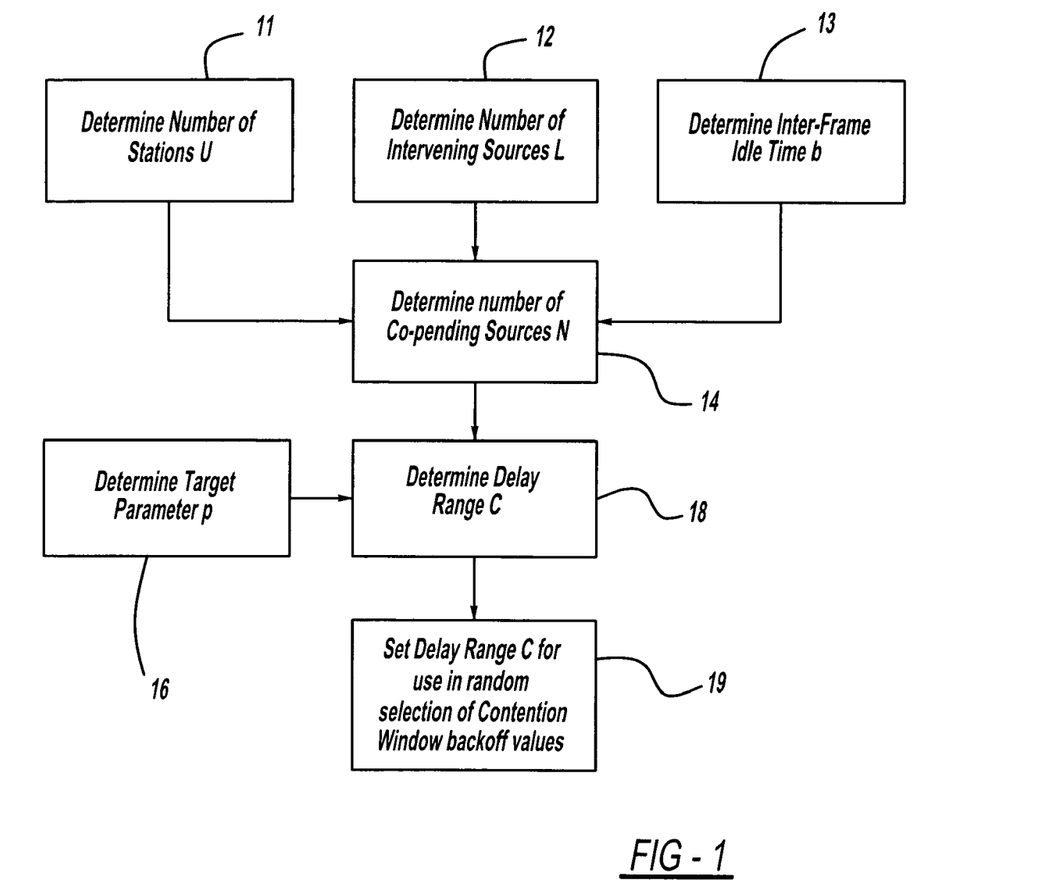
FIG. 1 is a diagram illustrating an exemplary method for adapting a contention window in a wireless communication system.

FIG. 1 illustrates an exemplary method for adapting a contention window for a given node in a wireless communication system. First, a determination is made at 14 as to the number of transmitting nodes ready to access a transmission medium in the system (also referred to herein as co-pending sources). One or more observations may be input into this determination. For instance, determining the number of co-pending sources may be based on an idle time between frames received at a given node, a number of intervening sources, a number of stations, or a combination thereof in the manner described below. Other inputs to this determination are also contemplated by this disclosure.

A target operating parameter is defined at 16. It is generally desirable to be able to configure a system to perform at a target operating point rather than maximize a particular variable, such as throughput. The reason for this is the tradeoffs. For example, a target operating point could obtain improved reliability at the detriment of throughput or maximizing throughput could sacrifice reliability. Second, without an acknowledgment scheme, radios generally do not know if frames have collided. Thus, radios generally do not know how the communication system is performing or will perform in terms of losing frames. Furthermore, even if there is a desired or target operating point, the radio has insufficient information to determine if the target is met or not. Third, key parameters that determine the likelihood of collisions and loss are generally unknown. For example, the number of co-pending sources is generally unknown because the internal state of one radio transceiver is unknown to other radio transceivers. For example, whether or not there is a frame ready at one station is generally unknown to another station. Another example is the internal parameters used by the MAC layers of other radios. Although all this information could potentially be communicated between stations, it would introduce overhead (a burden on channel capacity) and delay (increased latency).

In an exemplary embodiment, the target parameter is a probability of collision per round (i.e. for N frames). That is, the probability of one or more frames colliding out of the N pending frames. This is different from the probability of a particular frame being lost but it is related. Thus, other probabilities could be used as target parameters. Furthermore, other parameters that are not probabilities could also be used in other embodiments. For example, parameters indicative of congestion, latency, throughput or load could be used. The target parameter serves as an objective for the algorithm that adjusts the delay range because it sets an operating point to balance tradeoffs.

Intermediate target parameters may also be convenient for use in an algorithm to simplify repeated computation. In the exemplary embodiment, an intermediate parameter based on the probability of collision is used to reduce the number of computations per adaptation. The intermediate parameter is a function of the target parameter (probability of collision) and may be a convenient intermediate for algorithm implementation since it can be computed once and then used in the algorithm as N changes. However, if the target parameter changes, then the intermediate parameter should be recomputed.

A contention window (also referred to herein as delay range) is then determined at 18 as a function of the target parameter and the number of co-pending sources. The number of co-pending sources N is the number of sources with frames pending that are simultaneously ready to access the medium (hence the distinction between stations that are currently sources (transmitters) and stations that are currently sinks (receivers) or stations in general). So, the number of co-pending stations N is the number of stations contending at the same time, i.e. the number of currently active stations whether or not they each became ready to transmit a packet at the same time (although we consider this as a basic example below). There are alternatives to using N, such as determining another performance criteria that can be compared to the target parameter.

The motivation for determining a delay range is based on relations between collisions and unknown parameters that represent or indicate past or expected performance. Consider for example, if all frames become ready at the same time at N co-pending sources, each having a choice of C different delay values for the backoff value during the same busy period, then a collision can be avoided only if all N co-pending sources choose different values in the delay range (contention window). The probability of no collision is thus equal to the number of ways to choose a total of N different values in a delay range of C unique values, multiplied by the permutations of N sources and divided by the total combinations of ways that N co-pending sources could choose C values (unique or not). The probability of collision is just one minus that probability of no collision. However, note that if C is less than N, then at least two sources would end up choosing the same value and thus at least two frames would collide. Finally, recall that N is generally unknown and the value of C used by other stations is also generally unknown.

Frames can also collide even if they are not ready during the same busy time. Frames can collide if the difference between the randomly selected backoff values corresponds to the difference in idle time between when they are ready (when the backoff starts). Since the random values are chosen uniformly, the two situations are comparable. Thus, for the exemplary embodiment, where frames are transmitted over a continuous time frame, the mean number of co-pending sources is used. When frame transmissions are allocated to slots, with the possibility of many starting at the beginning of the slots, then the number starting at the beginning of the slots could be used.

Lastly, the computed delay range is used by a transmitting node to determine a random backoff value 19 which may be used by a channel access control mechanism. More specifically, the transmitting node randomly selects a value within the delay range as a backoff time and waits for the backoff time to expire before transmitting a frame from the given node.

In some embodiments, the delay range may be adapted over time to correspond with changes in the input and target parameters. In one embodiment, a target probability of collision can be used to determine an appropriate value for C given the determined value of N. The adaptation can be repeated periodically or when input or target parameters change or according to a configurable rate. In one embodiment, the delay range is set to achieve the desired probability of collision, which depends on the number of sources and the delay range. In another embodiment, the delay range is increased if the probability of collision is higher than desired and decreased if the probability of collision is lower than desired. For example, in one embodiment, the adaptation was performed every 16 idle periods (about every 16 frames) for a target probability of collision (one or more instances of two or more frames) per round of 20% or 40% (p=0.2 or 0.4). These target parameter values correspond to intermediate parameter values of about 2.2 and 1. The delay range C is determined in the preferred embodiment by multiplying the square of N by the intermediate parameter.

The probability of a given frame being lost due to collision would generally be less than the probability of collision in a round. For example, suppose N=4. For p=40%, the intermediate parameter is about 1 and thus the determined delay range C=16. For those values, the probability that a particular frame chooses a unique value is about 82%. So the probability of a given frame being lost is about 18% which is less than 40%. Since p is configurable, the invention can be configured to target a desired performance.

In one embodiment, there is no limit on the possible selection of the delay range. In another embodiment, the delay range is adjusted in steps to correspond to allowed values. For example, the algorithm could adjust the delay range value C in exponential steps to correspond to powers of two. In another embodiment, the delay range adaptation is not limited. In yet another embodiment, delay range choices are limited between a minimum and/or a maximum. For example, C may be restricted to the values available in existing 802.11 standards (e.g. [16, 32, 64, 128, 256, 512, 1024]) and incremented and decremented by multiplying or dividing by 2 respectively. The adaptation can be repeated periodically or when input or target parameters change or according to a configurable rate. The rate of adaptation can also be changed based on the dynamics of the situation (mobility, quantity of messaging or stations, etc).

An optional improvement to the algorithm is to compensate the estimation of N by the expected probability of collision. This collision compensation may be more significant for operation at high target collision rates and thus may be omitted for low target collision rates, which generally would be more typical reasonable operating points. The addition of collision compensation can be done by estimating the probability of collision based on N and C, using the same relation above, and then using that estimate in re-computing an estimate for N that takes into account that a fraction of the busy times between inter-frame idle times is actually due to multiple frames (collisions). In other words, N may be higher than otherwise estimated. This N can be computed if the probability of collision is known but if the probability is low, the difference will be small and may be negligible. An example of a simplification is to assume that if there are collisions, then the collisions on average involve two frames. Then, N may be multiplied by (1+p) to obtain an estimate of the collision compensated N.

The adaption algorithm above can be implemented on individual radio transceivers (stations) and operate independently in a distributed fashion. No coordination, signaling, or synchronization between stations is required. No information needs to be exchanged. It is to be understood that only the relevant steps of the adaptation algorithm are discussed above, but that other software-implemented instructions may be needed to control and manage the overall operation of the station.

In another embodiment, the adaptation algorithm could be implemented in a centralized configuration where one or more central points determine the delay range for other stations to use according to the invention. The centralized point would then share the delay range with other stations and those stations would adopt the value. In either configuration, stations could exchange information about whether or not a frame or frames are pending at the station, or will be pending, or have been pending, or delay range in use, or observations of the channel, such as the statistics of idle time between frames (discussed further below). This information could be input to the algorithm. However, note that performance of a centralized configuration may be disadvantaged by the lack of consideration for local conditions. In other words, the number of co-pending sources from one station's perspective may be different from another station's perspective if different stations are in range. In other words, the level of channel congestion may vary by location and thus the optimal delay range for the chosen target parameter may be different. A distributed implementation may be preferable to accommodate such conditions. However, in a centralized distribution, the C value in use at other stations may be known because the centralized point shared that value with stations for their use. The algorithm can use that delay range value C as the C value for estimating the number of co-pending stations from the IFIT. In the distributed configuration, the algorithm uses the local C in use at the station as the C value for the estimation. In alternative embodiments, a filtered C value (over time) or another estimate for the C value could be used. The C value should represent the general C in use by sources in the vicinity, even though they may differ. For example, the C value could tend toward the mean C value in use by sources in the vicinity. To accomplish this, stations could broadcast their C value in use as part of a general header, for example.

Figure 2:
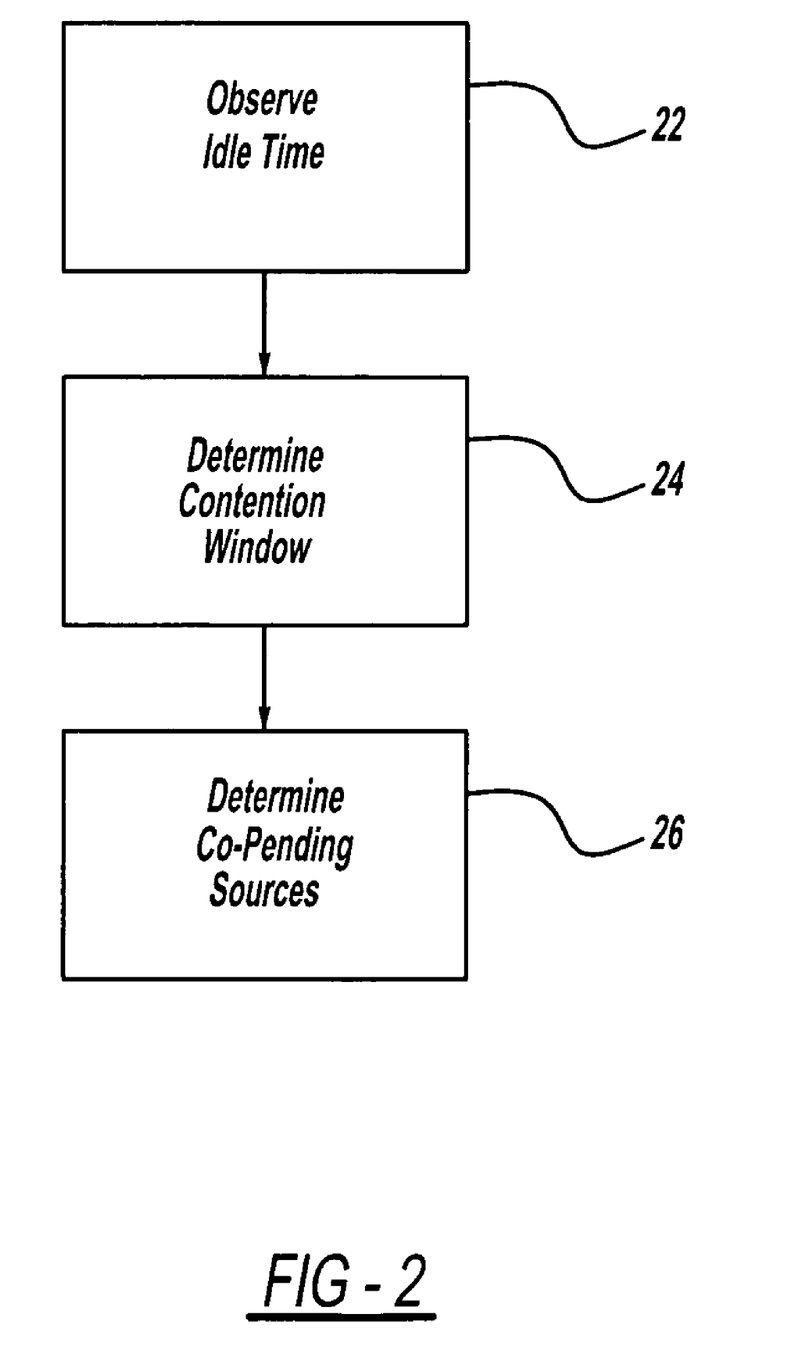
FIG. 2 is a diagram illustrating an exemplary method for determining the number of co-pending sources from observed idle time in a wireless communication system.

Another aspect of this disclosure is determining the number of co-pending sources N from one or more observations. FIG. 2 illustrates an exemplary embodiment. In the exemplary embodiment, the number of co-pending sources is estimated from observations of the idle time between frames received at a given node and the contention window currently in use by the given node. In the context of MAC, this idle time is commonly referred to as Inter-Frame Idle Time (IFIT) and is defined as the consecutive idle time between frames not including the Inter-Frame Spacing (IFS) contributions to idle time. In other words, the IFIT is defined as the time contributing to backoff countdown. In an alternative, IFIT could include Inter-Frame Spacing (IFS) time. IFIT serves as an indicator of the number of co-pending sources, N, because the higher N becomes, the smaller the inter-frame idle-times become for the same value of C.

If there are frames being transmitted in the communication system by processes other than those using the adaptation algorithm, then the general duration of IFITs may be influenced by those other processes. Examples are legacy stations (not adapting the contention window for broadcasts), unicasts, or different QoS classes (access categories or priority levels). The presence of these processes and the resulting frames may influence the characteristics of IFITs. Therefore, it may be desirable to account for this influence and to extract only the information relating to the number of co-pending frames that were transmitted using a particular process. The effect may be accounted for using a method of computing virtual IFITs. This method removes the influence of frames not transmitted according to the invention or frames of a different type, class or priority (even if using other instances of the invention).

Figure 4:
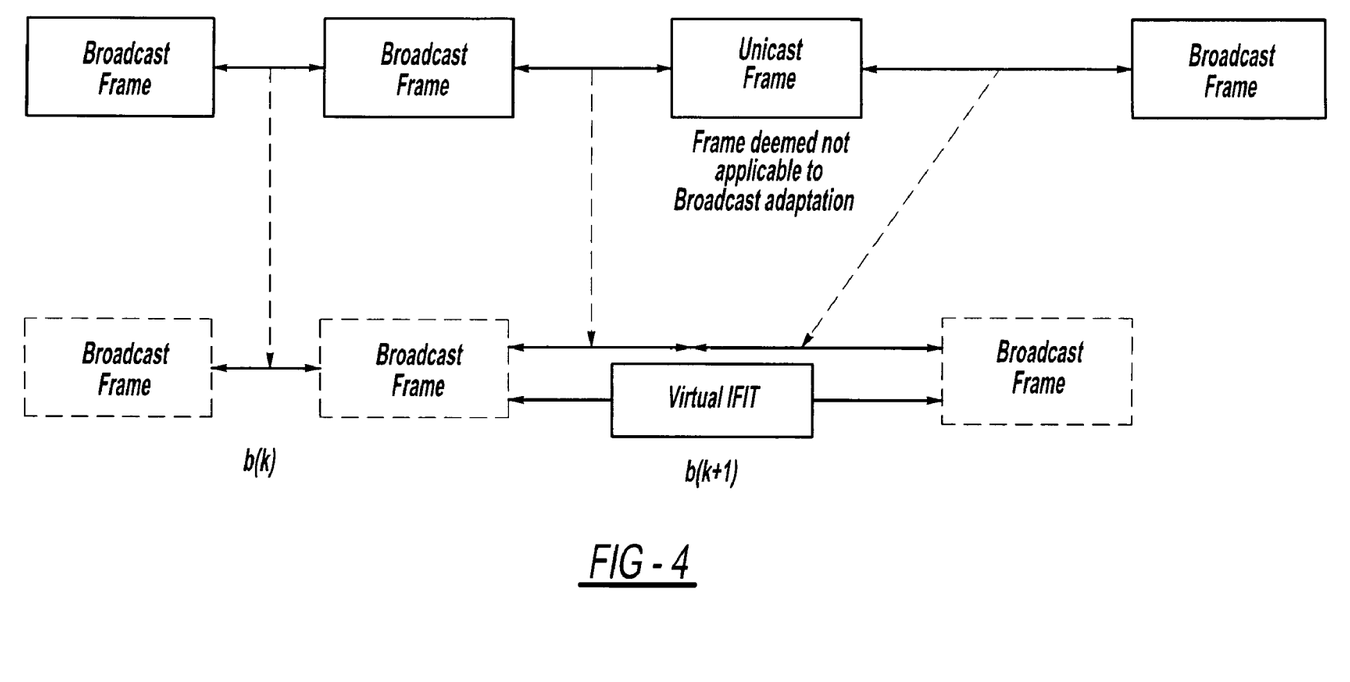
FIG. 4 is a diagram illustrating an exemplary method for determining the effective influence of frames from different processes on medium access in a wireless communication system.

The virtual IFIT method includes determining a frame's applicability (whether the frame is applicable to the particular adaptation or not) and computing virtual IFITs. A frame's applicability can be determined by examining the frame characteristics or contents. For example, a station adapting broadcast contention windows may check if a received frame's address is a broadcast address (applicable) or unicast address (not applicable) and thereby determine which frames are applicable. FIG. 4 is a diagram illustrating an exemplary virtual IFIT method for determining the effective influence of the unicast frames on IFIT when the adaptation algorithm is applied to broadcast frames only. If the frame is not applicable to the particular adaptation (i.e. in the example, not a broadcast), then the method appends the length of the IFIT following the frame to the IFIT preceding the frame to obtain a virtual IFIT duration for purposes of the particular adaptation (i.e. in the example, for broadcasts). This process of appending continues until the virtual IFIT accounts for all IFITs (one or more) between two consecutive applicable frames (i.e., in the example, two broadcasts, whether from the same station or different stations).

For example, suppose two stations are transmitting broadcasts and a third station is transmitting unicasts. Suppose the invention is applied to broadcasts only in this example. Furthermore, consider a case where the third station transmits two unicasts between two broadcasts transmitted by the first and second stations. According to the virtual IFIT method, the first station would compute a virtual IFIT equating to the sum of the three IFITs between its broadcasts. That virtual IFIT would be used in determining the number of co-pending stations for purposes of the broadcast contention window adaptation.

Thus, the virtual IFIT method may be useful for backward compatibility, mixed unicast and broadcast traffic, or applying the invention to quality of service levels or other situations where the IFIT is influenced by different or separate processes. For quality of service, a single C could be used for all priority levels, or a set of C values (one for each priority level) could be adapted together (incremented or decremented as a set), or a C value could be adapted for each priority level independently.

Figure 3:
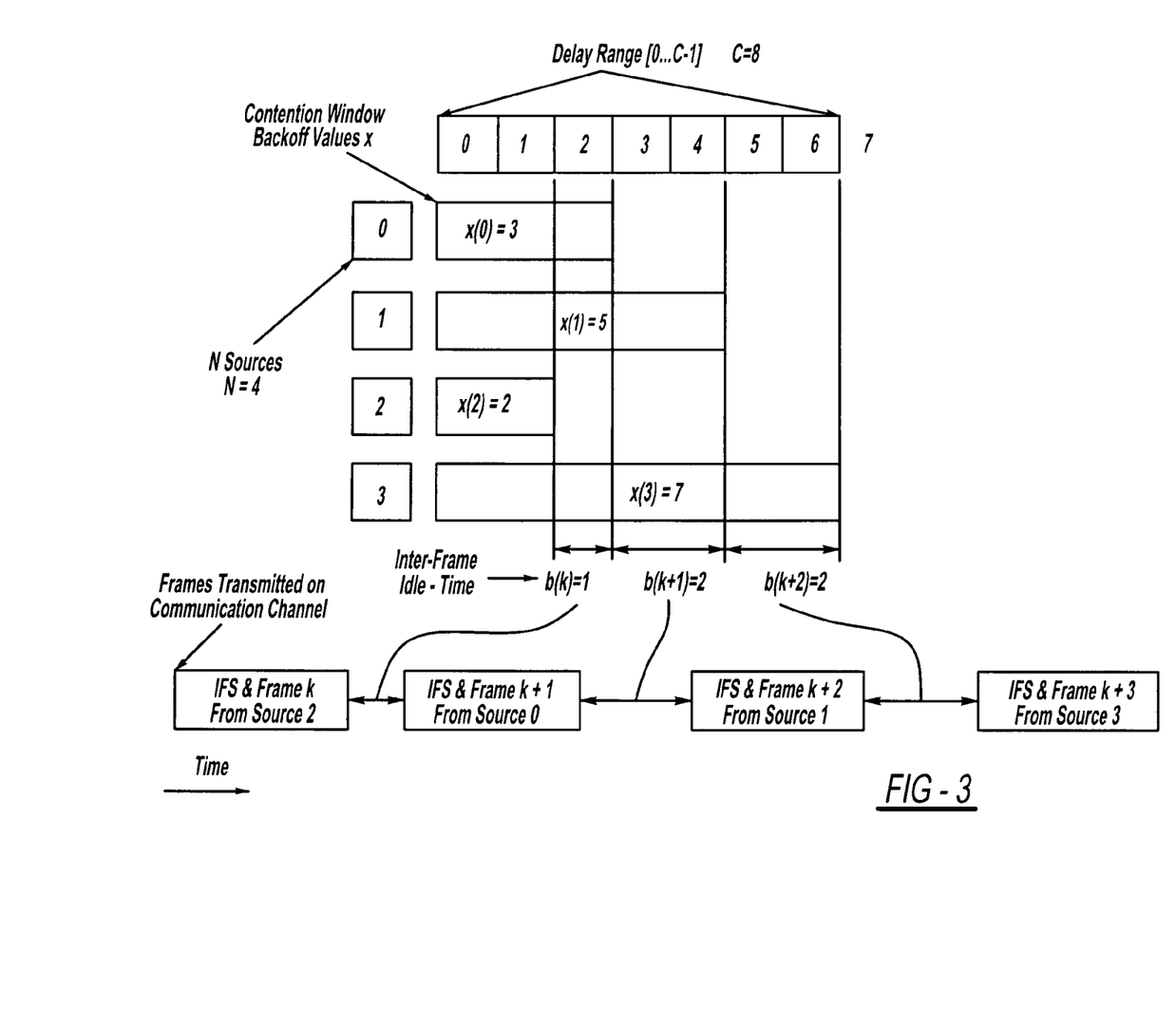
FIG. 3 is a diagram illustrating exemplary timing of backoff expirations and resulting time between frame transmissions in a wireless communication system.

FIG. 3 depicts an example of how Inter-Frame Idle Times (IFITs) occur based on backoff value determinations. When N sources have a frame start pending during the same busy period and choose N CW backoff values, the expected difference between consecutive backoff values can be approximated as C divided by N. However, this can differ depending on the timing of frame arrivals. If those sources do not have newly pending frames, then the average number of frames pending would be N/2. Therefore, the mean number can be used. Thus, the disclosure uses a measure of the current Inter-Frame Idle Time (IFIT), b, and the current C to estimate the mean number of continuously co-pending sources N, since generally, even though those co-pending sources may not continuously replace frames that are transmitted with new pending frames, other sources may have frames pending in the meantime. Thus, in the exemplary embodiment, N is estimated by dividing C by twice the average (or expected) IFIT b. Note that the C value used by other stations is generally unknown. Thus, the C value used in the operation above is the value used by the station (source) itself.

The number of stations U in the vicinity of a source or within range of that source, can also be an indicator of the number of co-pending sources N. The value N must be less than or equal to U (since, at most, all the stations may have frames ready to transmit at the same time). Thus U can be used as an upper bound on the estimate of N. In an exemplary embodiment, U is determined by observing the unique MAC addresses in frames received from other sources before filtering out those that are not destined for the receiver. Because transmissions are spread out over time, the diversity of sources should be observed over a period of time prior to the current time or a number of most recent frames received. The station should also count itself. Also, because of this use of MAC addresses, those addresses should be unique and not changing faster than the rate of the observation. Other addresses, such as IP addresses or mobile station identifiers could alternatively be used. Other techniques for determining U are also contemplated by this disclosure.

Figure 5:
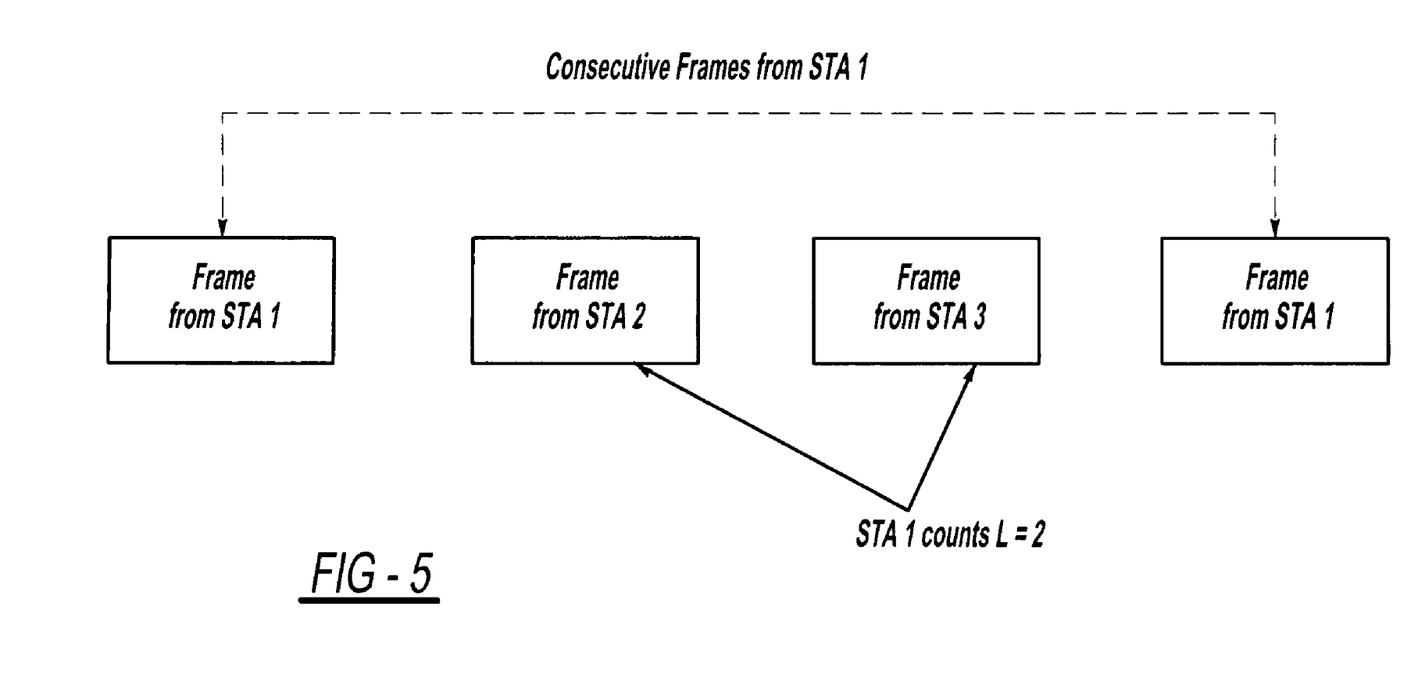
FIG. 5 is a diagram illustrating an exemplary method for determining a bound on the number of co-pending sources from observing the number of received frames between consecutive transmissions by the same station in a wireless communication system.

Since the time between two consecutively pending frames transmitted by the same source (i.e. not necessarily consecutive frames on the medium) depends on the contention mechanism, L, the number of frames transmitted by other sources in that time (between them), is also an indicator of N, the number of co-pending sources, and generally L would be greater than or equal to N. Thus, L may be used in the invention as a lower bound on the estimate of N. FIG. 5 is a diagram illustrating this exemplary method for determining a lower bound L. In the example L=2 since there are two frames between the consecutive frames from STA 1.

If a station does not have another frame ready immediately after transmitting a frame, then an alternate method can be used. In an exemplary alternative method, the value of L is computed by observing the number of frames transmitted during a time in which any station in backoff would accumulate the average backoff delay (e.g. (C−1)/2), since if the station did have back-to-back frames pending, it may on average wait that long between transmitting them. The observing station would add 1 to account for itself. This method may be used in general or only when the station does not have another frame ready immediately after transmitting. Alternatively, if another station is known to have frames constantly pending, then other stations could observe the number of frames transmitted between its consecutive frames to obtain L (and add 1 to account for that station).

Although the above two methods can be used for upper and lower bounds, alternatively, one or the other can be used alone. For example, the upper bound can be determined as a function of the lower bound, or vice versa. In one embodiment, the upper bound was computed as 1.5 times the lower bound. In another embodiment, the lower bound was computed as ⅔ of the upper bound. This can be useful if one or the other observation is unavailable. Also, it may be useful to bias the lower bound L upward to compensate for short-term variation and increase the rate of convergence. In one embodiment, the lower bound was biased upward by a factor of 1.25 or 1.5 but not to exceed U. In the exemplary embodiment, both L and U are smoothed using moving averages or a last number of samples. For example, in one case, U was computed based on observations over 1 second and L was based on an average of observations over about 100 frames. It is suggested that the rate or period of observation should correspond to the dynamics of the situation (mobility of the stations, change in quantity of stations transmitting, etc) and could be adapted based on the dynamics.

The basis for the exemplary embodiment described above is set forth below. Consider N co-pending sources determining N backoff values in the range [0, C−1]. Let those backoff values be denoted, $$\hat{x}_{C,N} = [x_1, \ldots, x_N].$$

If n=2N sources, during the same busy period, start backoffs with random values between 0 and C−1 idle slots, then the expected mean number of frames pending over the next C−1 idle slots (consecutive or otherwise) is N, or, $$E\{N\} = \frac{n}{2}. \tag{1-1}$$

Thus, the mean number of frames pending over a given time can be related to the initial condition of a given number of frames pending. Since the start times can spread out and the random values are uniformly distributed, the mean number of co-pending frames for continuous operation can be related to the equivalent number had all started at the backoff at the same time.

If each i of N co-pending sources, waits for $x_i$ idle slots, not including inter-frame spacings (IFS), before transmitting the frame pending at that source, then the expected duration of idle time between frames, not including inter-frame spacings (IFS), can be approximated by, $$N \cong \frac{C}{2E\{b\}}, \tag{2-1}$$

where $E\{b\}$ is the expected Inter-Frame Idle Time (IFIT).

The number of co-pending frames N cannot exceed the number of stations U.

$$N \leq U. \tag{2a-1}$$

If a source with continuously co-pending frames receives frames from L unique sources with continuously co-pending frames, between transmissions of its own frames, then, in general, N cannot be less than L+1, $$N \geq L+1. \tag{2b-1}$$

This is because, in the worst case, the observing station chooses the longest backoff, and there will be N−1 stations transmitting before the observing station.

An observer of the inter-frame idle-time (IFIT) between frames, i.e. $E\{b\}$, not including inter-frame spacing, can determine N based on the value of C that was used by solving equation (2-1) and bound the estimate by U and L according to equations (2a-1) and (2b-1). The algorithm may also use a filter for determining N.

In one embodiment, the upper and lower bounds on N can applied to the estimate N' based on the inter-frame idle time (IFIT) b. Alternatively, the bounds could be applied to a filtered N'. Alternatively, the one of the bounds could be applied before filtering and the other after. For example, the following applies the upper bounds before filtering, and the lower bounds after filtering. In the example, the value is rounded up (biased upward in the preferred embodiment) to the next integer because there must be an integer number of stations.

$$N'(t+1) = \text{ceil}(\max(L, kN'(t-1) + (1-k)\min(N, U)))$$

In one embodiment, this combination of an IIR filter and bounds was used with a coefficient of k=0.8333 (i.e. (1−k)=⅙) was used.

If N co-pending sources determine N backoffs as independent and uniform random variables, each within the range [0, C−1], then the probability of a two or more values being the same is, $$p = 1 - \frac{N!\binom{C}{N}}{C^N} \tag{3-1}$$

The value of p is the probability of collision (one or more with two or more frames in each) over then next C−1 idle slots. Above, the standard bracket form was used to represent the number of ways of choosing j of i unique elements in a set, $$\binom{i}{j} = \frac{i!}{j!(i-j)!}.$$

The value of C required for a specific probability of collision p can be approximated given the number of co-pending sources N, as, $$C \cong -\frac{N(N-1)}{2\ln(1-p)}, \tag{4-1}$$

Once N has been determined and a desired probability of collision p is determined, a value to use for C can be determined using (4-1) or a more convenient form, $$C \cong \alpha N^2, \tag{2b-1}$$

where the co-efficient $\alpha$ can be computed once if p does not change, $$\alpha = -\frac{1}{2\ln(1-p)}. \tag{4-2.2}$$

In one embodiment, p=0.2 so $\alpha$ was about 2.24. In another p=0.4, so $\alpha$ was about 1.

The algorithm then can set the C value at the source or increment or decrement the current C value toward the determined C value (such as in increments of powers of 2). The algorithm may also bound the C value by upper and lower bounds.

The probability of a given set of independent values is, $$P\{\hat{x} = [x_1, \ldots, x_n]\} = \frac{1}{C^n}.$$

The mean number of frames pending over an interval [0, C−1] is, $$N(\hat{x}) = \frac{1}{C-1} \sum_{c=0}^{C-1} \sum_{i=1}^{n} \begin{cases} 1 & x_i \geq c \\ 0 & x_i < c \end{cases}.$$

The two dimensional sum simplifies to a one-dimensional sum in the x dimension, $$N(x) = \frac{1}{C-1}\sum_{i=1}^{n} x_i.$$

The expected mean number of frames pending over an interval [0, C−1] is given by the multi-dimensional sum, $$E\{N\} = \frac{1}{C-1}\sum_{\hat{x}} P\{\hat{x}\}N(\hat{x}).$$

Substituting equations above yields, $$E\{N\} = \frac{1}{C^n(C-1)^2}\sum_{x_1=0}^{C-1}\cdots\sum_{x_n=0}^{C-1}\sum_{i=1}^{n} x_i$$

Reordering the summations to be symmetric across $x_i$ yields a generic summation, $$E\{N\} = \frac{1}{C^n(C-1)^2}\sum_{x_i=0}^{C-1} x_i$$

Substituting the sum of the finite series yields, $$E\{N\} = \frac{n}{2}. \quad (1\text{-}1)$$

The difference between the k+1'th and the k'th shortest backoff values determines the k'th inter-frame idle time, given by, $$b(k) = \min_{k+1}(\hat{x}) - \min_k(\hat{x}).$$

where the subscript on the minimum function indicates the k'th minimum. The expected value of the inter-frame idle time is, $$E\{b(k)\} = \sum_{\hat{x}} (\min_{k+1}(\hat{x}) - \min_k(\hat{x}))P\{\hat{x}\}$$

Applying the transformation over the space [0, C−1], $$f(k) = \text{rem}(k-q, C-1)$$

to shift any (q+1)'th backoff difference to the $1^{st}$, $$f(q+1) = 1 \quad q \in I, C \geq 1$$

Thus, $$E\{b(f(q+1))\} = \sum_{\hat{x}} (\min_2(\hat{x}) - \min_1(\hat{x}))P\{\hat{x}\}$$

By symmetry of the uniform random backoff value range [0, C−1], $$E\{b(k)\} = E\{b(n+2-k)\} \quad \forall 1 \leq k \leq n-1$$

The combination of these relations yields a result independent of k, $$E\{b(k)\} = E\{b(l)\} \quad \forall 1 \leq k, l \leq n-1$$

and motivates dropping the index k from b. The sum of the n−1 backoff differences plus the value of the smallest backoff value, plus the difference between C and the largest backoff value, must be equal to C, $$\sum_{k=1}^{n-1} E\{b\} + E\{\min(\hat{x})\} + C - 1 - E\{\max(\hat{x})\} = C - 1$$

By symmetry of the uniform random backoff value range [0, C−1], $$E\{\min(\hat{x})\} = C - 1 - E\{\max(\hat{x})\}$$

Thus, $$(n-1)E\{b\} + 2E\{\min(\hat{x})\} = C-1$$

Solving for the expected b value, $$E\{b\} = \frac{C - 1 - 2E\{\min(\hat{x})\}}{n-1}$$

The expected value of the smallest backoff value is, $$E\{\min(\hat{x})\} = \sum_{\hat{x}} \min(\hat{x})P\{\hat{x}\}$$

Dividing the multidimensional sum into three parts: (1) all sources have values in the range [0, C−2], (2) all permutations of j sources having a value C−1, while all others have values [0, C−2], and (3) all values are C−1, yields, $$E\{\min(\hat{x})\} = \sum_{x_1=0}^{C-2}\cdots\sum_{x_n=0}^{C-2} \min(\hat{x})P\{\hat{x}\} + \sum_{j=1}^{n-1}\binom{N}{j}\sum_{x_{j+1}=0}^{C-2}\cdots\sum_{x_n=0}^{C-2} \min([x_{j+1},\ldots,x_n])$$
$$P\{\hat{x} = [C-1,\ldots,C-1,x_{j+1},\ldots,x_n]\} +$$
$$(C-1)P\{\hat{x} = [C-1,\ldots,C-1]\}$$

The arguments of the minimum function in the second part were simplified because the maximum possible value is C−1.

The probability of the backoff values in the subspace with all dimensions [0, C−1] can be expressed in terms of the smaller subspaces where all dimensions are [0, C−d], d>0, $$P\{\hat{x}_{C,n}\} = \left(\frac{C-d}{C}\right)^n P\{\hat{x}_{C-d,n}\}$$

Furthermore, $$P\{\hat{x}_{C,n} = [C-1, \ldots, C-1, x_{j+1}, \ldots, x_n]\} = \frac{1}{C^j} P\{\hat{x}_{C,n-j}\}$$

The summations in the first two parts motivate a recursive formula, $$E\{\min(\hat{x}_{C,n})\} = \left(\frac{C-1}{C}\right)^n E\{\min(\hat{x}_{C-1,n})\} +$$

$$\left(\frac{C-1}{C}\right)^n \sum_{j=1}^{n-1} \binom{n}{j}\left(\frac{1}{C^j}\right) E\{\min(\hat{x}_{C-1,n-j})\} +$$

$$\frac{(C-1)}{C^n}$$

which can be solved analytically, where the iterative base is given by, $$E\{\min(\hat{x}_{1,n})\} = 0$$

and, $$E\{\min(\hat{x}_{C,1})\} = \left(\frac{C-1}{2}\right).$$

However, the multipliers in the third part, and those in the second part, are small relative to the first term, for large n, because of the divisor exponent of C. Yet, for C>>n>1, $$\lim_{C \to \infty} \left(\frac{C-1}{C}\right)^n = 1$$

Thus, $$E\{b_{C,n}\} \cong \frac{C-1}{n-1}$$

Expressing the expectation in terms of the average number of co-pending frames, gives, $$E\{b\} \cong \frac{C-1}{2E\{N\}-1}$$

Note that if a further simplification is motivated, for large values, $$E\{b\} \cong \frac{C}{2E\{N\}}, \qquad (2\text{-}1)$$

Or $$\boxed{E\{N\} \cong \frac{C}{2E\{b\}}}.$$

The probability of a given backoff value is given by the uniform random selection, $$P\{x_i = x\} = \frac{1}{C}.$$

To avoid a collision, all N sources must select different backoff values, or $$x_i \neq x_j \; \forall i \neq j.$$

The number of combinations of backoff values is $C^N$, and the number of combinations of N sources selecting different backoff values is the number of ways to choose N of C values and the permutations of each of those. Thus, the probability of a collision is, $$p = 1 - \frac{N! \binom{C}{N}}{C^N}. \qquad (3\text{-}1)$$

Rearranging and taking the natural logarithm yields, $$\ln(1-p) = \ln\left(\frac{C!}{C^N (C-N)!}\right).$$

Substituting Stirling's approximation for factorial, $$a! \cong \sqrt{2\pi a} \left(\frac{a}{e}\right)^a,$$

and simplifying gives, $$\ln(1-p) \cong -\left(C - N + \frac{1}{2}\right) \ln\left(1 - \frac{N}{C}\right) - N.$$

Expanding the natural logarithm in the right hand side, with an infinite series yields, $$\ln(1-p) \cong \left(C - N + \frac{1}{2}\right) \sum_{i=1}^{\infty} \frac{\left(\frac{N}{C}\right)^i}{i} - N$$

Expanding to three summations and canceling out the N term in the first, yields, $$\ln(1-p) \cong \sum_{i=2}^{\infty} \frac{N^i}{iC^{i-1}} - \sum_{i=1}^{\infty} \frac{N^{i+1}}{iC^i} + \frac{1}{2}\sum_{i=1}^{\infty} \frac{N^i}{iC^i}$$

Shifting the index on the first to combine the first and second summations yields, $$\ln(1-p) \cong \sum_{i=1}^{\infty} \frac{N^{i+1}}{iC^i}\left(\frac{-1}{(i+1)}\right) + \frac{1}{2}\sum_{i=1}^{\infty} \frac{N^i}{iC^i}$$

Combining the two summations yields, $$\ln(1-p) \cong \sum_{i=1}^{\infty} \left(\frac{1}{2i}\right)\left(\frac{N}{C}\right)^i\left(1 - \frac{2N}{(i+1)}\right)$$

Define the terms as, $$a_i = \left(\frac{1}{2i}\right)\left(\frac{N}{C}\right)^i\left(1 - \frac{2N}{(i+1)}\right).$$

The quantity within the third bracket will be zero for term i=j satisfying, j=2N−1.

Preceding terms will be negative, and subsequent terms will be positive. The magnitude of those terms satisfy, $$\left|1 - \frac{2N}{(i+1)}\right| \le c_0$$

where, $$c_0 = \begin{cases} N-1 & i < j \\ 0 & i = j \\ \frac{1}{2N+1} & i > j \end{cases}.$$

Therefore, the terms of the summation satisfy, $$|a_i| \le h_i.$$

where, $$h_i = \frac{c_0}{2i}\left(\frac{N}{C}\right)^i$$

Operating a system at N>C would result in collision and thus motivates N<C for a reasonable operating point. Taking the derivative of the bounds with respect to i yields, $$\frac{d}{di}h_i = -\frac{c_0}{2i}\left(\frac{N}{C}\right)^i\left(\ln\left(\frac{C}{N}\right) + \frac{1}{i}\right).$$

A bound on the above is, $$\frac{d}{di}h_i < -\frac{c_1}{i}\left(\frac{N}{C}\right)^i,$$

where, $$c_1 = \frac{c_0}{2}\ln\left(\frac{C}{N}\right).$$

Since the upper bound on the magnitude of the terms is decreasing at a rate faster than a decreasing rate proportional to the upper bound term itself, this motivates approximating by the first term, $$\ln(1-p) \cong -\frac{N(N-1)}{2C}.$$

Solving for C yields, $$C \cong -\frac{N(N-1)}{2\ln(1-p)}.$$

Note that if a further simplification is motivated, for N>1, p may be represented as an offset Gaussian, as, $$p \cong 1 - e^{-\frac{N^2}{2C}},$$

and then, $$C \cong -\frac{N^2}{2\ln(1-p)}. \quad (4\text{-}1)$$

A convenient form for an algorithm is, $$C \cong \alpha N^2 \quad (4\text{-}2.1)$$

Because the co-efficient can be computed once if p does not change, $$\alpha = -\frac{1}{2\ln(1-p)}. \quad (4\text{-}2.2)$$

The above description is merely exemplary in nature and is not intended to limit the present disclosure, application, or uses.

What is claimed is:

1. A method for adapting a contention window for a given node in a wireless communication system, comprising:
defining a target parameter indicative of congestion on a transmission medium;
determining a number of transmitting nodes ready to access the transmission medium;
determining a contention window from which to select a delay value for transmitting over the transmission medium, where the contention window is a function of the target parameter and the number of transmitting nodes; and
determining whether a frame is applicable to the adaptation and appending idle times between two consecutive applicable frames, where one or more frames not applicable to the adaptation are interposed between the two consecutive applicable frames; wherein
determining a number of transmitting nodes further comprises observing an idle time between frames at the given node and computing the number of transmitting nodes as a function of the observed idle time.

2. A method for adapting a contention window for a given node in a wireless communication system, comprising:
defining a target parameter indicative of congestion on a transmission medium;
determining a number of transmitting nodes ready to access the transmission medium;
determining a contention window from which to select a delay value for transmitting over the transmission medium, where the contention window is a function of the target parameter and the number of transmitting nodes; and
determining a contention window, C, in accordance with $$C \cong -\frac{N^2}{2\ln(1-p)}$$

where p is a probability of a frame colliding with another frame and N is the number of transmitting nodes.

3. A method for adapting a contention window for a given node in a wireless communication system, comprising:
defining a target parameter indicative of congestion on a transmission medium;
determining a number of transmitting nodes ready to access the transmission medium;
determining a contention window from which to select a delay value for transmitting over the transmission medium, where the contention window is a function of the target parameter and the number of transmitting nodes;
constraining the number of transmitting nodes within an upper bound indicative of a number of nodes in the vicinity of the given node; and
determining the upper bound by observing unique addresses in frames received at the given node from other nodes.

4. A method for adapting a contention window for a given node in a wireless communication system, comprising:
defining a target parameter indicative of congestion on a transmission medium;
determining a number of transmitting nodes ready to access the transmission medium;
determining a contention window from which to select a delay value for transmitting over the transmission medium, where the contention window is a function of the target parameter and the number of transmitting nodes; and
constraining the number of transmitting nodes within a lower bound, where the lower bound correlates to a number of nodes from which frames were received between two consecutive frames transmitted by the given node.

5. A method for determining a number of nodes ready to access a transmission medium in a wireless communication system, comprising:
observing an idle time between frames received at a given node in the wireless communication system;
determining a contention window currently in use by the given node;
estimating a number of nodes ready to access the transmission medium as a function of the idle time and the contention window currently in use by the given node; and
estimating a number of node in accordance with $$E\{N\} \cong \frac{C}{2E\{b\}}$$

where C is the contention window currently in use and E{b} is the idle time.

6. A method for determining a number of nodes ready to access a transmission medium in a wireless communication system, comprising:
observing an idle time between frames received at a given node in the wireless communication system;
determining a contention window currently in use by the given node;
estimating a number of nodes ready to access the transmission medium as a function of the idle time and the contention window currently in use by the given node;
constraining the number of transmitting nodes within an upper bound indicative of a number of nodes in the vicinity of the given node; and
determining the upper bound by observing unique addresses in frames received at the given node from other nodes.

7. A method for determining a number of nodes ready to access a transmission medium in a wireless communication system, comprising:
observing an idle time between frames received at a given node in the wireless communication system;
determining a contention window currently in use by the given node;
estimating a number of nodes ready to access the transmission medium as a function of the idle time and the contention window currently in use by the given node; and
constraining the number of transmitting nodes within a lower bound, where the lower bound correlates to a number of nodes from which frames were received between two consecutive frames transmitted by the given node.

8. A method for adapting a contention window for a given node in a wireless communication system, comprising:
defining a target probability for a frame colliding with another frame;
determining a number of transmitting nodes ready to access the transmission medium;

determining a contention window from which to select a delay value for transmitting over the transmission medium, where the contention window is a function of the target probability and the number of transmitting nodes; and determining whether a frame is applicable to the adaptation and appending idle times found adjacent to frames which are not applicable to the adaptation and interposed between two consecutive applicable frames; wherein determining a number of transmitting nodes further comprises observing an idle time between frames at the given node and computing the number of transmitting nodes as a function of the observed idle time.

9. A method for adapting a contention window for a given node in a wireless communication system, comprising:

defining a target probability for a frame colliding with another frame;

determining a number of transmitting nodes ready to access the transmission medium;

determining a contention window from which to select a delay value for transmitting over the transmission medium, where the contention window is a function of the target probability and the number of transmitting nodes; and determining a contention window, C, in accordance with $$C \cong -\frac{N^2}{2\ln(1-p)}$$

where p is the target probability of a frame colliding with another frame and N is the number of transmitting nodes.

10. A method for adapting a contention window for a given node in a wireless communication system, comprising:

defining a target probability for a frame colliding with another frame;

determining a number of transmitting nodes ready to access the transmission medium;

determining a contention window from which to select a delay value for transmitting over the transmission medium, where the contention window is a function of the target probability and the number of transmitting nodes;

randomly selecting a value within the contention window as a backoff time and waiting for the backoff time to expire before transmitting a frame from the given node; and determining the upper bound by observing unique addresses in frames received at the given node from other nodes.

11. A method for adapting a contention window for a given node in a wireless communication system, comprising:

defining a target probability for a frame colliding with another frame;

determining a number of transmitting nodes ready to access the transmission medium;

determining a contention window from which to select a delay value for transmitting over the transmission medium, where the contention window is a function of the target probability and the number of transmitting nodes; and constraining the number of transmitting nodes within a lower bound, where the lower bound correlates to a number of nodes from which frames were received between two consecutive frames transmitted by the given node.

12. A method for adapting a contention window for a given node in a wireless communication system, comprising:

defining a target parameter indicative of congestion on a transmission medium;

observing an idle time between frames at the given node;

estimating a number of transmitting nodes ready to access the transmission medium as a function of the observed idle time;

determining a contention window from which to select a delay value for transmitting over the transmission medium, where the contention window is a function of the target parameter and the number of transmitting nodes; and determining a contention window, C, in accordance with $$C \cong -\frac{N^2}{2\ln(1-p)}$$

where p is a probability of a frame colliding with another frame and N is the number of transmitting nodes.

13. A method for adapting a contention window for a given node in a wireless communication system, comprising:

defining a target parameter indicative of congestion on a transmission medium;

observing an idle time between frames at the given node;

estimating a number of transmitting nodes ready to access the transmission medium as a function of the observed idle time;

determining a contention window from which to select a delay value for transmitting over the transmission medium, where the contention window is a function of the target parameter and the number of transmitting nodes;

constraining the number of transmitting nodes within an upper bound indicative of a number of nodes in the vicinity of the given node; and determining the upper bound by observing unique addresses in frames received at the given node from other nodes.

14. A method for adapting a contention window for a given node in a wireless communication system, comprising:

defining a target parameter indicative of congestion on a transmission medium;

observing an idle time between frames at the given node;

estimating a number of transmitting nodes ready to access the transmission medium as a function of the observed idle time;

determining a contention window from which to select a delay value for transmitting over the transmission medium, where the contention window is a function of the target parameter and the number of transmitting nodes; and constraining the number of transmitting nodes within a lower bound, where the lower bound correlates to a number of nodes from which frames were received between two consecutive frames transmitted by the given node.

* * * * *